United States Patent [19]

Hobbs et al.

[11] Patent Number: 4,651,075
[45] Date of Patent: Mar. 17, 1987

[54] SERVOED ACCELEROMETER HAVING ISOLATED VOLTAGE TORQUING AND METHOD

[75] Inventors: Larry P. Hobbs, Brentwood; Harold D. Morris, Orinda, both of Calif.

[73] Assignee: Systron Donner Corporation, Concord, Calif.

[21] Appl. No.: 628,735

[22] Filed: Jul. 9, 1984

[51] Int. Cl.[4] .............................................. G05B 5/01
[52] U.S. Cl. ................................... 318/651; 318/615; 318/648; 318/689; 73/517 B; 307/118
[58] Field of Search ............... 318/651, 615, 648, 689; 73/517 B; 307/118, 121, 124

[56] References Cited

U.S. PATENT DOCUMENTS

| | | | |
|---|---|---|---|
| 3,883,788 | 5/1975 | Storey, Jr. ........................... | 318/648 |
| 4,102,202 | 7/1978 | Ferris ................................. | 318/648 X |
| 4,144,764 | 3/1979 | Hartzell, Jr. ...................... | 318/615 X |
| 4,180,774 | 12/1979 | Odone et al. ..................... | 318/640 X |
| 4,282,470 | 8/1981 | Reynolds ........................... | 318/648 |
| 4,337,402 | 6/1982 | Nowakowski ..................... | 307/121 |
| 4,353,254 | 10/1982 | Schroeder et al. ................ | 73/517 B |
| 4,459,849 | 7/1984 | Calamera ........................... | 73/517 B |

Primary Examiner—B. Dobeck
Attorney, Agent, or Firm—Flehr, Hohbach, Test, Albritton & Herbert

[57] ABSTRACT

Servoed accelerometer with isolated voltage torquing having first and second grounds, a servoed accelerometer having a torque coil, and an amplifier for driving said torque coil. The amplifier has inverting and non-inverting junctions. The second ground is coupled to the non-inverting junction of the amplifier. A torque signal supply is coupled to the first ground. A transformer is provided for coupling the torque signal supply to the non-inverting junction of the amplifier and serves to isolate the torque signal supply from the non-inverting input of the amplifier so that the amplifier and polarity of the torque signal are preserved.

19 Claims, 5 Drawing Figures

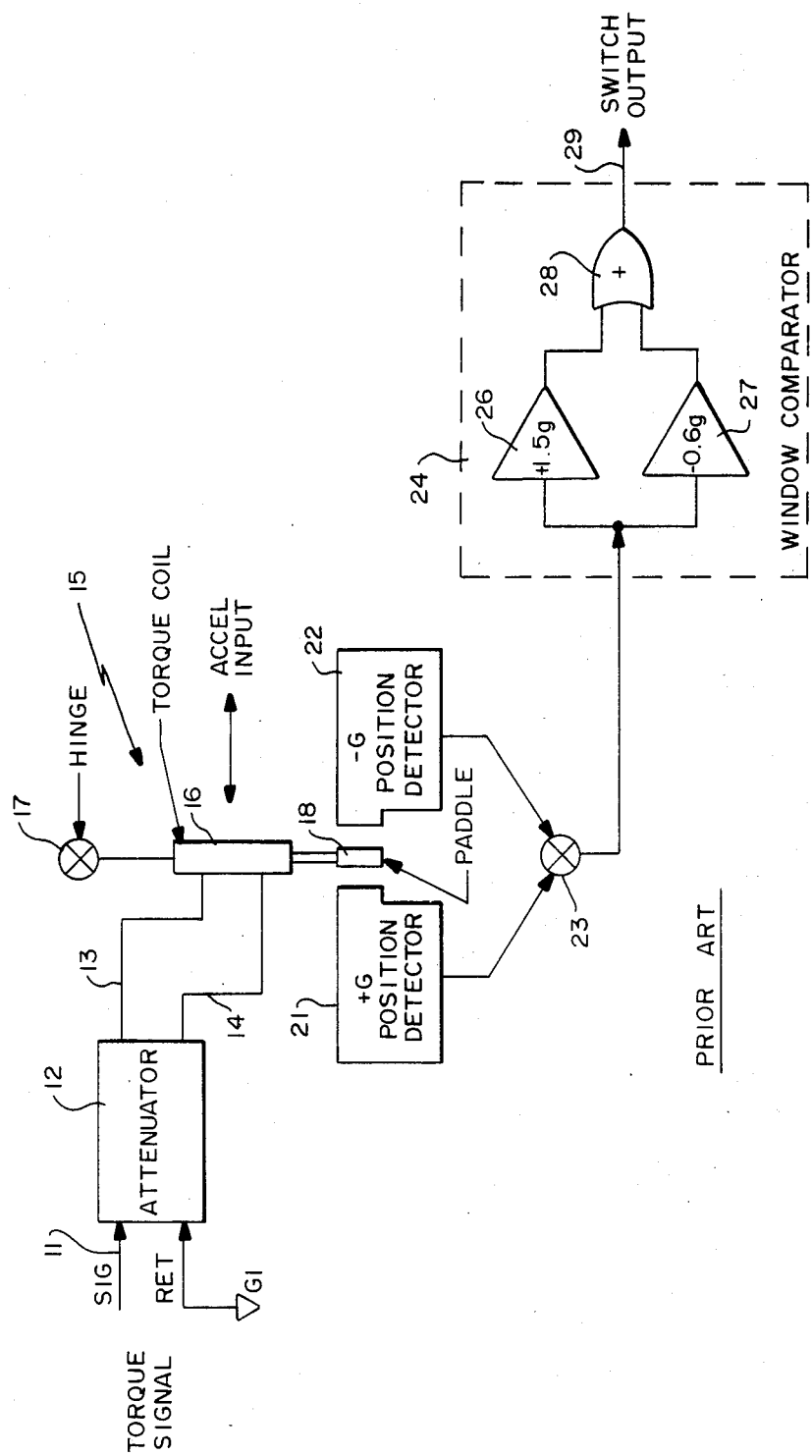
FIG.—1
PRIOR ART

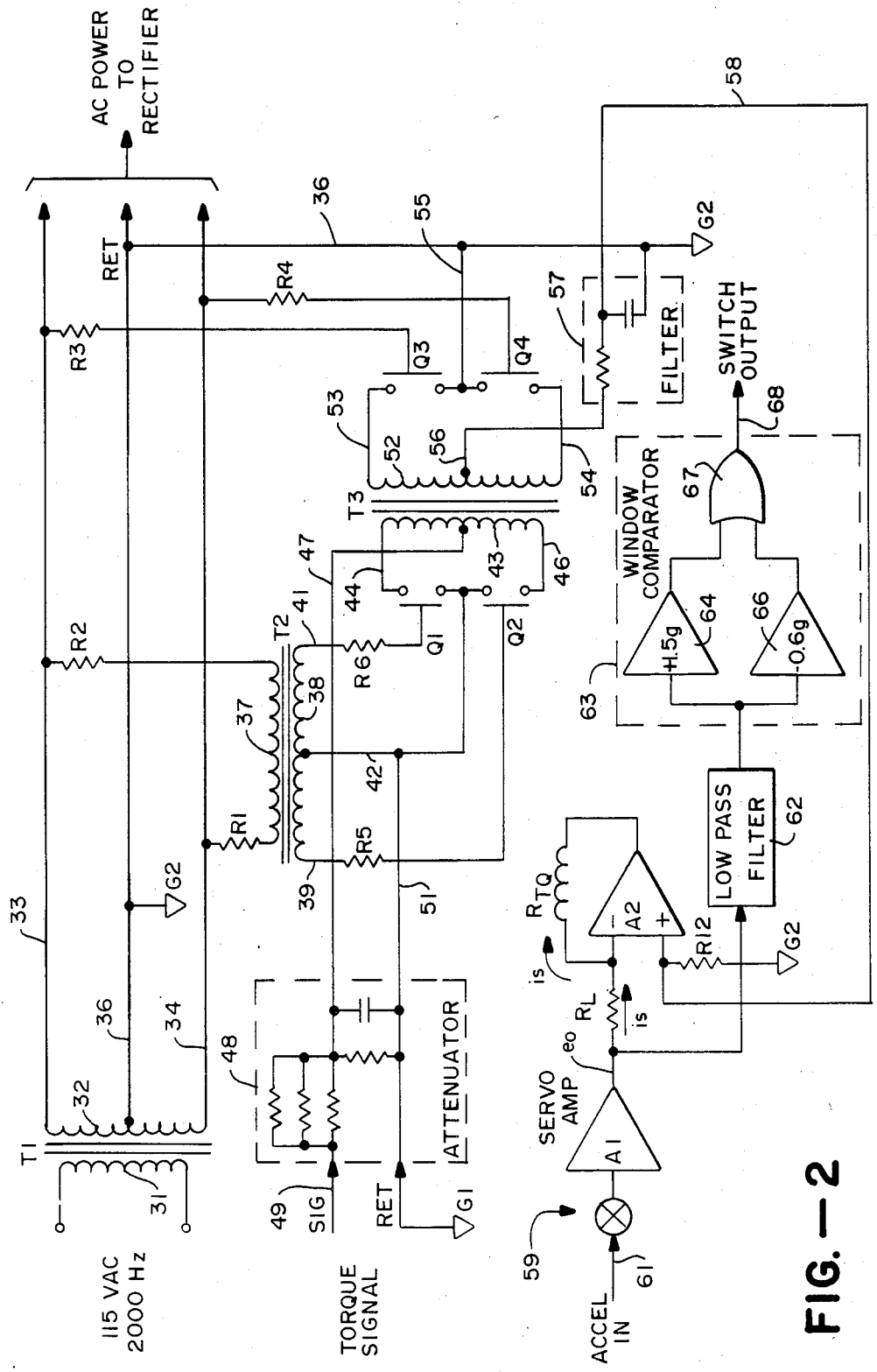
FIG.—2

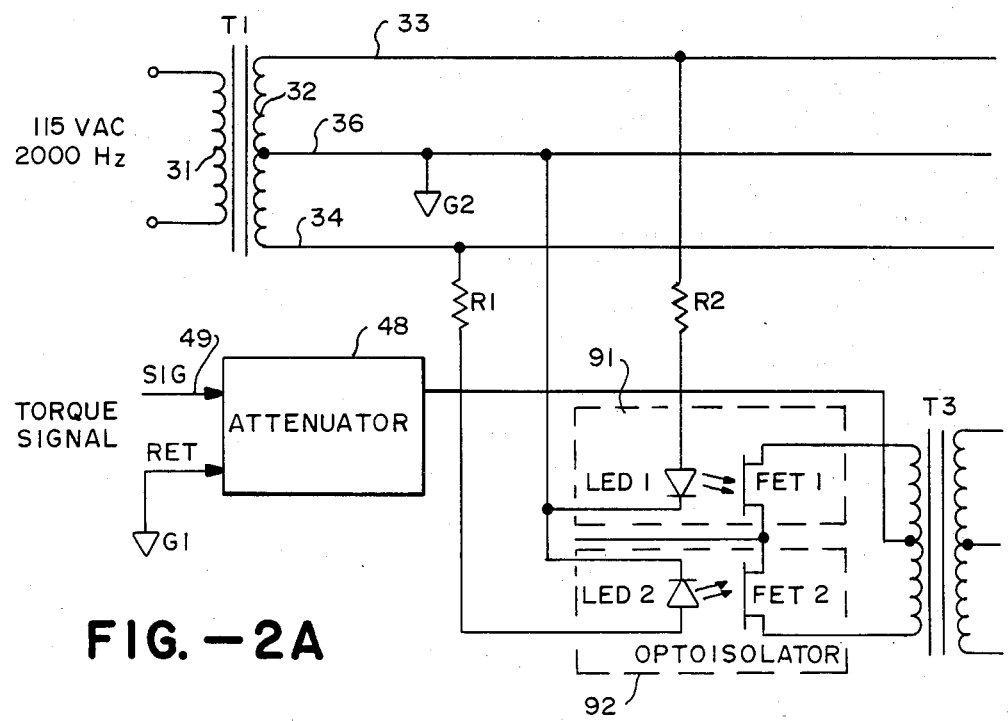
FIG.—2A
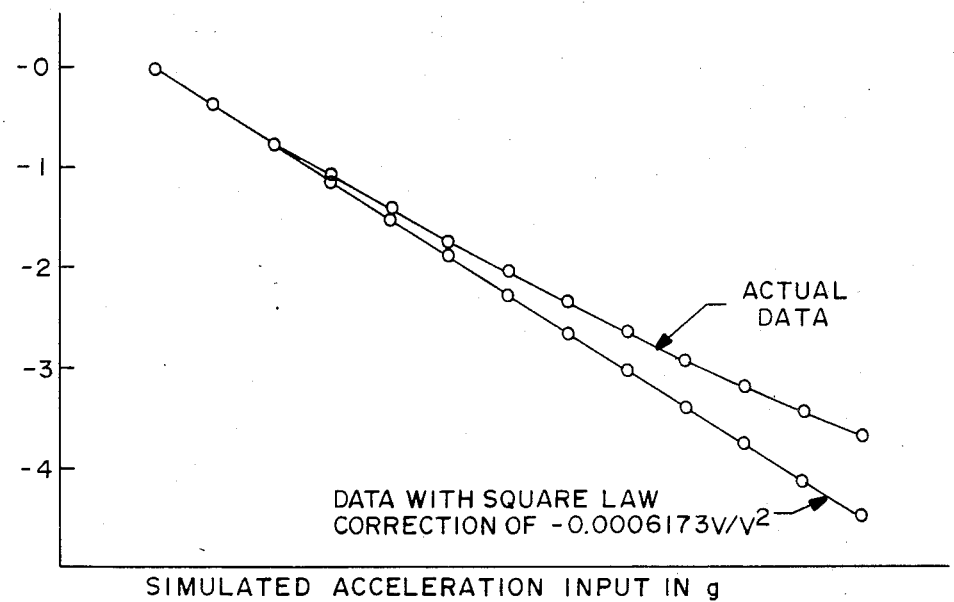
FIG.—3

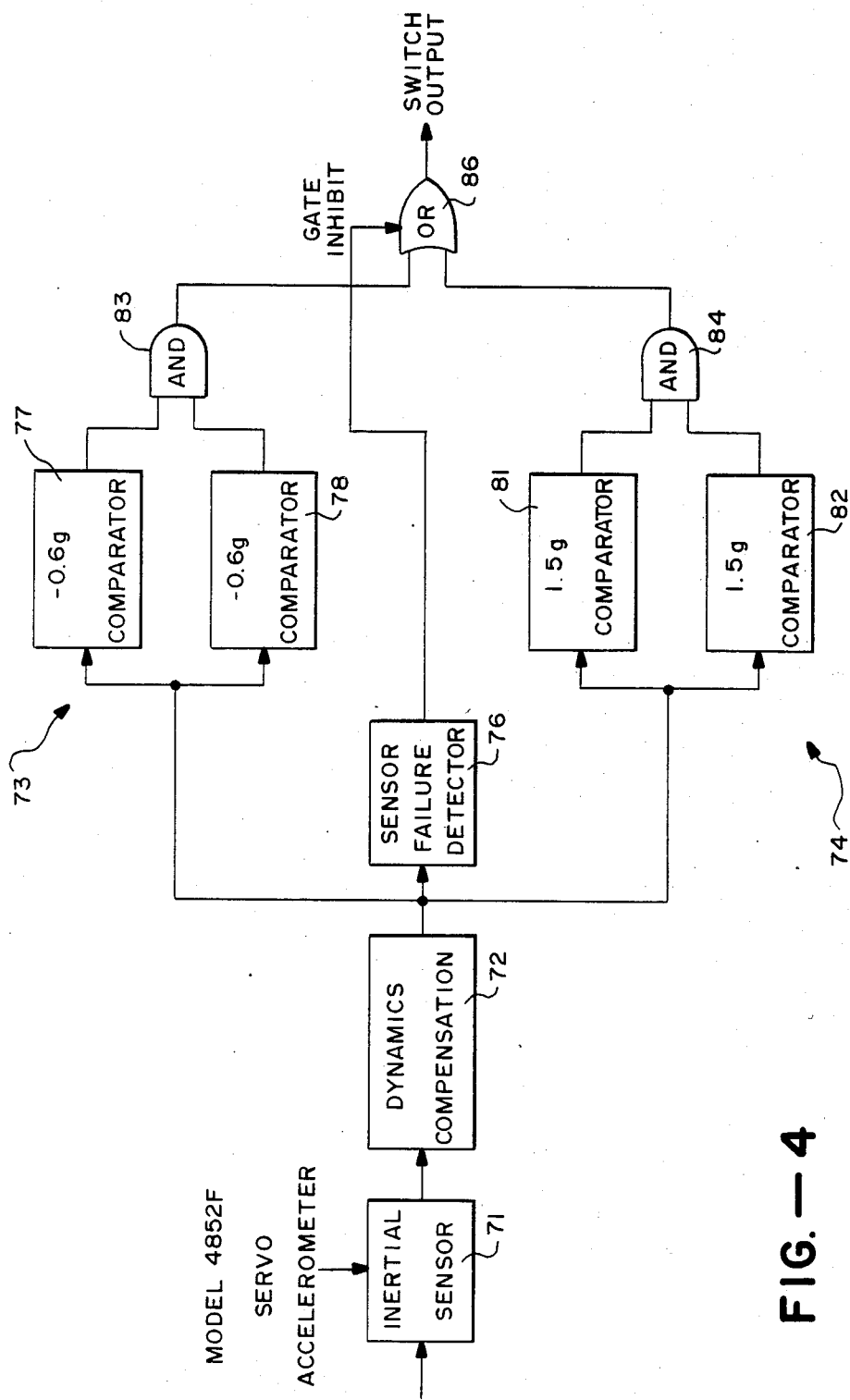
FIG.—4

SERVOED ACCELEROMETER HAVING ISOLATED VOLTAGE TORQUING AND METHOD

The invention relates to closed loop accelerometers and more particularly to closed loop accelerometers having isolated voltage torquing.

Accelerometers have heretofore been utilized in destruct acceleration switches. Such destruct acceleration switches have been utilized in launch vehicles to sense abnormal functioning of the launch vehicle and causing it to destruct as a part of a firing safety system. In such launch vehicles, redundant systems or in other words multiple channel systems have been provided to supply information to the destruct acceleration switch for the launch vehicle. In the past and at least in certain applications it has been the practice to provice parallel channels of information so that a signal from any one of the multiple channels would cause a destruct command to be supplied to the launch vehicle. This practice is undesirable in that a better practice would be to provide redundancy in which at least two destruct signals would be required before a destruct signal is sent to the launch vehicle. There is therefore a need for a destruct acceleration switch having such redundancy and which can be utilized with the test equipment for testing destruct acceleration switches not having such redundancy.

In general, it is an object of the present invention to provide a servoed accelerometer and method which can be utilized in applications in which an unserved or open loop accelerometer has been used.

Another object of the invention is to provide a servoed accelerometer and method of the above character which can be utilized in conjunction with the destruct acceleration switches.

Another object of the invention is to provide a servoed accelerometer and method of the above character which can be used in a destruct acceleration switch utilizing redundant sensors.

Another object of the invention is to provide a servoed accelerometer and method of the above character in which the servoed accelerometer can be utilized as redundant sensors in a destruct acceleration switch and be tested with the same testing system as had been utilized with open loop accelerometers.

Another object of the invention is to provide a servoed accelerometer and method of the above character which utilizes isolated voltage torquing.

Another object of the invention is to provide a servoed accelerometer having isolated voltage torquing and method which can be utilized in the same test system.

Another object of the invention is to provide a servoed accelerometer and method of the above character which can be tested with the same signals that are used for an open loop accelerometer.

Additional objects and features of the invention will appear from the following description in conjunction with the accompanying drawings.

FIG. 1 is a schematic block diagram of an open loop accelerometer with isolated voltage torquing representative of the prior art.

FIG. 2 is a block diagram partially in schematic form of a closed loop accelerometer incorporating the present invention and having isolated voltage torquing.

FIG. 2A is a block diagram of a modification of a portion of the circuitry in the block diagram shown in FIG. 2.

FIG. 3 is a graph showing the output of the servoed accelerometer having isolated voltage torquing shown in FIG. 2.

FIG. 4 is a block diagram of a destruct acceleration switch utilizing servoed accelerometers having isolated voltage torquing of the present invention.

In FIG. 1, there is shown a block diagram of an open loop accelerometer having isolated voltage torquing which is representative of the prior art. As shown therein, a torque signal is supplied on line 11 in the form of a finite voltage through an attenuator 12. The attenuator 12 converts the voltage signal to a current signal and this current signal is supplied through two wires or conductors 13 and 14 to a torque coil 16. The torque coil 16 is a part of a flexured pendulus moving system 15 such as that supplied in the Systron Donner Model 5310 open loop accelerometer and generally described in U.S. Pat. No. 3,331,253. The flexure pivot for the pendulum 15 is represented at 17. The pendulum 15 carries a paddle 18, the position of which can be sensed by positive G and negative G position detectors 21 and 22 respectively disposed on opposite sides of the paddle 18. The position detectors 21 and 22 can be in the form of priximity detectors which supply a DC signal to a summing junction 23 in the form of a resistive divider network. The output from the summer 23 is supplied to a window comparator 24. As shown, the window comparator 24 includes two voltage comparators 26 and 27. With their inputs connected to the output of the summing junction 23 and with their outputs connected to an OR gate 28. It can be seen that the voltage comparators 26 and 27 are designed in such a manner so that if a signal greater than $+1.5$ g or a signal less than $-0.6$ g is supplied from the summing junction 23, a destruct signal will be supplied through the OR gate onto the output 29 from the window comparator. This output 29 is utilized to develop a destruct signal or command 29 for use in a conventional destruct switch.

In FIG. 2 there is shown a block diagram of a closed loop accelerometer utilizing isolated voltage torquing incorporating the present invention.

The circuitry shown in FIG. 2 as shown therein includes three iron core transformers identified as T1, T2 and T3. The transformer T1 can be characterized as being a power transformer which has its primary winding 31 connected to a suitable source of voltage such as 115 volts AC, 2000 Hertz. The transformer T1 reduces the voltage on its secondary winding 32 to a suitable voltage such as approximately 20 volts AC. Typically this voltage should be a voltage which can be utilized with standard transistor amplifiers and logic circuits. The secondary 32 of the transformer T1 is connected to lines 33 and 34 at its outer extremities and has a center tap connected to a line 36. The center tap line 36 is connected to a ground G2. The lines 33 and 34 are connected through high impedance resistors R1 and R2 to the primary 37 of the transformer T2 which can be characterized as a "piggyback" transformer. Transformer T2 provides unity transformation and thus supplies the same voltage which is supplied from the secondary of the transformer T1 to the secondary 38 of the transformer T2 as, for example, 20 volts. By the use of this second transformer T2, the secondary 38 is floating with respect to the primary 37 and makes it possible for the secondary to be utilized to control electronic devices as hereinafter described isolated from the ground G2.

The secondary winding 38 is connected to lines 39 and 41 and its center tap is connected to a line 42. The secondary winding 38 controls field effect transistors Q1 and Q2 connected to the lines 39 and 41 through current limiting resistors R5 and R6. The field effect transistors Q1 and Q2 are connected to the primary 43 of the transformer T3 by lines 44 and 46. The center tap of the primary winding 43 is connected by a line 47 on the output of an attenuator 48 which receives the torque signal on its input 49. The attenuator 48 is comprised of a resistive-capacitive network as shown. The other return input of the attenuator 48 is connected to a ground G1 as shown. The other output of the attenuator 48 is connected by line 51 to the line 42 connected to the center tap of the transformer T2 and to the transistors Q1 and Q2. The secondary 52 of the transformer T3 has its outer extremities connected to lines 53 and 54 which are connected to additional field effect transistors Q3 and Q4. The transistors Q3 and Q4 are connected through high impedance resistors R3 and R4 to lines 33 and 34 respectively. The other terminals of the field effect transistors Q3 and Q4 are connected by a line 55 to line 36 which is connected to ground G2. The center tap of the secondary 52 of the transformer T3 is connected by a line 56 to a conventional RC filter 57. The filter 57 can be omitted if desired.

It can be seen that the transformer T3 with its associated field effect transistors Q1 and Q2 actually operates as a full wave modulator that is driven by the isolating transformer T2. The field effect transistors Q1 and Q2 act as semiconductor switches and produce an alternating voltage whose output voltage amplitude is proportional to the torque signal supplied as a DC voltage to the attenuator 48. The direct current signal from the attenuator 48 is supplied to that primary 43 of the transformer T3. The field effect transistors Q1 and Q2 are operated in response to the AC voltage supplied by the secondary 38 of the transformer T2 and are alternately turned on and off. This causes opposite halves of the primary winding 43 of the transformer T3 to be supplied with the PC signal from the attenuator 48 to produce in the transformer T3 a flux wave which effectively represents the DC input voltage to the attenuator 48, with its magnitude proportional to the DC voltage and its phase with respect to the reference incoming power line to the transformer T1 representing the polarity of the DC voltage torque signal supplied on line 49 to the attenuator 48. The voltage on the second of the power transformer T1 acts through the high impedance resistors R3 and R4 to control the electronic switches provided by the field effect transistors Q3 and Q4 serving as full wave demodulators to alternately connect the filter 57 first to one half of the secondary of the transformer T3 and then to the other half of the secondary of the transformer T3, converting the AC voltage on the secondary of transformer T3 into a proportional DC voltage.

Thus it can be seen that there is a synchronous demodulation of the AC voltage produced on the secondary of the transformer T3 producing an output DC signal which is linearly proportional to the torque signal supplied to the attenuator 48. The demodulation is synchronous because the same AC voltage is used for both the modulation and the demodulation. Since this output from the demodulators is pulsating in nature, the filter 57 is utilized to smooth out the signal. The filter 57 provides a nominal DC signal which is proportional to the original applied torque signal voltage. This DC signal is supplied from the output of the filter 57 onto a line 58 to an electrical input of the accelerometer 59 of a conventional servoed type. Typically such an accelerometer can be a dual pickoff type in which the acceleration force is represented by the input 61 is measured and is supplied to a servo amplifier A1. The output on the amplifier A1 is supplied through a load resistor $R_L$ to the inverting input of output amplifier A2. The output of the amplfier A2 is connected through the torque coil $R_{TQ}$ of the accelerometer 59 to he inverting input of amplifier A2. The non-inverting input of the amplifier A2 is connected to ground G2 through a resistor R12. The amplifier A2 provides sufficient current flow through the torque coil $R_{TQ}$ resulting in a restoring torque so as to bring the paddle back into a center position between the dual pickoffs. It thus provides a feedback current in the torque coil $R_{TQ}$ which is directly proportional to the acceleration input 61. This same current flows through the load resistor $R_L$ and provides a voltage signal which is directly proportional to the acceleration input. This output voltage is supplied into second order low pass filter 62 of the type described in U.S. Pat. No. 3,122,714 with a corner frequency of 20 Hertz and a damping ratio of approximately 0.8. The low pass filter is selected so that different types of accelerometers can be utilized in the circuit herein described while providing a particular controlled dynamic response.

The output from the low pass filter 62 is supplied to a window comparator 63 of the type hereinbefore described which consists of voltage comparators 64 and 66 which are connected to an OR gate 67 to provide a switch output on output 68.

Operation of the circuitry shown in FIG. 2 may now be briefly described as follows. Let it be assumed that 115 volts AC at 2000 Hertz is connected to the primary of the transformer T1 and that power at some 2000 Hertz frequency at a suitable voltage such as 20 volts is supplied by the secondary of the transformer T1 to the primary of the transformer T2 which can be a one-to-one transformer. The secondary of the transformer T2 supplies this 2000 Hertz voltage signal at approximately 20 volts RMS with two opposite phases to the field effect transistors Q1 and Q2, alternately turning on and off the field effect transistors Q1 and Q2. The field effect transistors Q1 and Q2 are alternately turned on and off so that one of the transistors is turned on while the other transistor is turned off, reversing each half cycle of the 2000 Hertz drive signal.

The input torquing signal is supplied to the input 49 to the attenuator 48 at a voltage level as, for example, three volts per g. The attenuator 48 attenuates the signal so that the output signal on the attenuator is approximately ½ volt per g. The capacitor provided as a part of the attenuator serves to filter out high frequency noise. The signal from the attenuator 48 is supplied to the center tap of the primary of the transformer T3. The flux density which is created in the transformer T3 is proportional to the torque signal supplied to the center tap 47 of the transformer T3. This changing flux density in the transformer T3 produces a proportional voltage wave on its secondary which is supplied to the center tap 56 of the secondary of the transformer T3 so that the output on the center tap is approximately ½ volt per g. This signal from the center tap 56 is supplied through the RC filter 57. The output signal from the filter 57 is supplied for the accelerometer 59 which operates as hereinbefore described.

The field effect transistors Q3 and Q4 are alternately turned on and off by the power from the output of the secondary of the transformer T1 producing in effect synchronous demodulation of the signal. Since a sine wave is applied to the field effect transistors, a dead period occurs during the time when the sine wave applied to the field effect transistors goes through zero, causing both transistors to be on simultaneously for a short time. Output signal fluctuations produced by this dead period are effectively removed by the filter 57 which has a corner frequency of 100 Hertz which gives approximately 32 db of attenuation at 2000 Hertz. Presence of the dead period does result in a small linearity deviation of the inputoutput curve, measured at zero frequency. Such deviations would be esentially eliminated if transformer T1 were driven with the square wave voltage, since the rapid voltage reversals would effectively eliminate the dead period during which both field effect transistors are turned on simultaneously.

The transformer T2 serves as an isolation transformer and isolates the input ground G1 from the output ground G2. In other words it provides an isolated drive to drive the input or to chop the input signal, allowing the circuit to function normally with even a thousand volts between input and output grounds, limited only by the insulation of transformers T2 and T3.

When a signal is supplied from the output of the filter 57 to the accelerometer 59, the servo loop is closed by the current flowing through the load resistor $R_L$ and being forced by the operational amplifier A2 to flow through the torque motor as represented by the coil $R_{TQ}$ with the current being sufficient to support the pendulum in a position neutral or midway between the two position detectors. The output signal from the accelerometer is supplied at the left end of the load resistor $R_L$ at the terminal $e_o$ which is the voltage which is necessary to force the appropriate current through the load resistor $R_L$ since all that current must flow through the torque motor coil $R_{TQ}$. In the event that the winding of the torque motor opens for any reason, the servo amplifier A1 will go to full scale and thus it will be impossible to produce a correct output of any kind at the terminal $e_o$ supplied from the torque command line. This circuitry eliminates the possibility that an accelerometer with an open torque motor can produce a correct output signal while the servo of the accelerometer is malfunctioning.

With the system shown in FIG. 3, when a signal is supplied to the positive reference junction of the operational amplifier A2, a curren is suddenly caused to flow in the torque motor $R_{TQ}$ because the voltage across $R_L$ is no longer correct. This sudden current flow through the torque motor cause the pendulum to move to a new position which causes the output voltage of the servo amplifier A1 to jump to the new correct value and this in turn produces the desired voltage torquing output for the downstream testing of the destruct switch in which the system shown in FIG. 2 is mounted.

It should be noted that use of the specific servo loop configuration of FIG. 2 permits application of torquing command signals to the positive reference junction of amplifier A2, producing command signals across resistor R12. Since the value of R12 can be made large at the discretion of the designer, much larger than $R_L$ if desired, the power required to produce a particular simulated acceleration level can be made arbitrarily small, making possible use of this disclosed inventio for isolated voltage torquing which utilizes the actual DC input signal power for driving the servo loop to simulate acceleration. In this way, the design is made resistant to false operation, since the isolated voltage torquing circuitry is basically passive, and cannot erroneously generate a spurious torquing signal as a result of a component failure in that circuitry.

In FIG. 3 there is shown a graph which shows the relationship between the output voltage and the g's of simulated acceleration input. Two curves are shown in the graph with the upper curve representing actual data and the second curve representing data corrected by a mathematical square law. This shows the error produced by use of a sine wave drive signal, causing the dead periods during switching, as hereinbefore described. The curves show that the actual data though slightly nonlinear, is nearly ideally compensated by use of a mathematical square law correction, showing that a sine wave can be utilized. Therefore it is unnecessary to utilize a square wave for operating the field effect transistors Q1 through Q4. However, it should be appreciated that if a square wave were utilized the input-output linearity would be more nearly ideal than that exhibited by the experimental circuit driven by a sine wave.

From the foregoing it can be seen that the isolated voltage torquing system is self-powered for signal transmissio. This is important because if there were a failure in the voltage torquing system shown in FIG. 2, there still would be no signal supplied from the filter 57. This is a result of using inactive signal processing circuitry for the modulation/demodulation functions, with the field effect transistors acting only as switches. If active circuitry were utilized in the self test and there was a single point failure, the accelerometer could be commanded to produce a correct output even though it had no voltage torquing input. This would constitute a single point failure possibility which is undesirable.

All the signal conversion elements in FIG. 2 are comprised of either transformers which cannot self-generate any power or field effect transistors which function as switches and cannot themselves generate a signal. It should be pointed that the secondary of the isolation transformer T2 is isolated from the input signal provided through the attenuator 46 by resistors R5 and R6 which can have a suitable value as, for example, five megohms which is sufficient to turn on and off the field effect transistors Q1 and Q2 but is not sufficient under any failure conditions to transmit a signal which does not represent a true input. Likewise transformer T3 transforms energy from the incoming signal to the secondary but cannot itself generate any signal. The field effect transistors Q3 and Q4 which do the switching on the secondary of transformer T3 are themselved isolated from the power source by resistors R3 and R4 which also can have a suitable high value such as five megohms. Since this is the case, the transistors Q3 and Q4 cannot, in any failure mode, generate any "go" or voltage torquing signals. Thus it can be seen that there has been provided essentially a fail safe system which utilizes energy from the original ilnput signal to produce the output voltage and this makes it basically a passive system from the standpoint of single point failure. Since the circuitry is selfl-powered and isolatled, it can be identical in function and scaling to the previous circuitry so that it can be utilized with the same test system.

As can be seen, the system is one in which a common ground has not been provided, and has in fact been avoided. Ground to ground isolation is provided by the transformers T2 and T3. The entire input circuitry is totally floating and can be of any voltage only as limited by the insulation resistance of the windings of the transformers T2 and T3. The output circuitry is referenced to a local destruct switch ground $G_2$.

A block diagram showing a destruct acceleration switch utilizing the system and apparatus hereinbefore described in conjunction with FIG. 2 is shown in FIG. 4. For the inertial sensor 71, a Systron Donner Model 4852F Servo Accelerometer can be utilized in place of a Systron Donner Model 5310 Open Loop Accelerometer. Dynamics compensation is provided in block 72 so that the response of the combined system, namely the Model 4852F Accelerometer with the dynamics compensation is substantially identical to the response of the model 5310 accelerometer which inherently has a much narrower band width than the servo accelerometer. The dynamics compensation 72 provides band width restrictions in series to provide identicality of response.

The signal output from the dynamics compensation block 72 is provided to window comparators 73 and 74 and to a sensor failure detector 76. The window comparators 73 and 74 are of the type hereinbefore described. Comparators 73 includes two −0.6 g comparators 77 and 78 and window comparator 74 includes 1.5 g comparators 81 and 82. The outputs of the comparators 77 and 78 are supplied to an AND gate 83 whereas the outputs of the comparators 81 and 82 are supplied to an AND gate 84. The outputs of the AND gates 83 and 84 are supplied to an OR gate 86. The OR gate also receives the output from the sensor failure detector 76. The output of the OR gate 86 provides the destruct command signal.

When there is no acceleration, there is no output from the inertial sensor 71 and therefor there will be no outputs from the window comparators 73 and 74. When this is the case, there is no output from either of the comparators. However, if a positive acceleration is being sensed by the inertial sensor 71 which exceeds the 1.5 g or conversely, if a negative torque signal is sensed by the inertial sensor which is less than −0.6 g, a signal is supplied through the OR gate 86.

Another embodiment of the invention is shown in FIG. 2A in which one of the transformers, namely transformer T2 has been eliminated and in its place there has been substituted two opto-isolator circuits 91 and 92 of a conventional type which include light emitting diodes as shown. The opto-isolators 91 and 92 are connected through high impedance resistors R1 and R2 to lines 33 and 34 connected to the secondary 32 of the transformer T1. Thus it can be seen that the opto-isolators 91 and 92 operate directly from the secondary of the transformer T1 and make it possible to eliminate the transformer T2. In this embodiment of the invention, the transformer T3 serves to isolate the input ground G1 from the output G2. The transformer T3 is provided for transmitting the chopped signal from the primary to the secondary of the transformer T3. Alternatively, active circuitry can be utilized on the primary to produce a duty factor modulated pulse train where the pulses are separated by a magnitude proportional by time differential to a input differential. In such a case, it would be possible to eliminate the use of the transformer T3, and to transmit the information by way of light across to the secondary circuitry rather than by using transformer T3.

From the foregoing it can be seen that there has been provided a servoed accelerometer having isolated voltage torquing and a method for using the same. In the method and system disclosed, it is possible to use a closed loop or servoed accelerometer in applications where heretofore open loop accelerometers have been utilized while still utilizing the same test equipment which has been utilized for testing systems using open loop accelerometers. Isolated voltage torquing can still be utilized to test the destruct switch prior to launching of the vehicle. By the provision of such a method and system, it is possible to utilize the test systems heretofore installed and used for open loop accelerometers while still providing the desired redundancy.

What is claimed is:

1. In a servoed accelerometer having isolated voltage torquing, first and second grounds, a servoed accelerometer having a torque coil, and an amplifier for driving said torque coil, said amplifier having inverting and non-inverting junctions, means coupling the second ground to the non-inverting junction of the amplifier, means coupled to the first ground for supplying a torque signal, and transformation means coupling the means supplying a torque signal to the non-inverting junction of the amplifier and serving to isolate the means supplying a torque signal from the non-inverting input of the amplifier so that the amplitude and polarity of the torque signal are preserved.

2. An accelerometer as in claim 1 wherein the transformation means includes DC to AC modulation means, AC to DC demodulation means and means coupling the modulation means and the demodulation means.

3. An accelerometer as in claim 2 wherein the coupling means is in the form of a transformer having a primary winding and a secondary winding.

4. An accelerometer as in claim 2 wherein the coupling means is in the form of light transmitting means.

5. In a servoed accelerometer having isolated voltage torquing, first and second grounds, a servoed accelerometer having an electrical input and an electrical output, means coupling the second ground to the electrical input of the servoed accelerometer, means coupled to the first ground for supplying a torque signal, and transformation means coupling the means supplying a torque signal to the electrical input of the servoed accelerometer and serving to isolate the means supplying a torque signal from the electrical input of the servoed accelerometer so that the amplitude and polarity of the torque signal are preserved even though the means providing a torque signal and the servoed accelerometer have different and independent grounds, said transformation means including a transformer having primary and secondary windings, modulation means coupling said primary winding to the means supplying the torque signal, demodulation means coupled to the secondary winding and to the servoed acclerometer, a source of AC power, means coupling the source of AC power to said modulation means and to said demodulation means for causing synchronous operation of said modulation means and demodulation means.

6. An accelerometer as in claim 5 wherein said modulator is a DC and AC converter and wherein said demodulator is an AC to DC converter.

7. An accelerometer as in claim 5 wherein said DC to AC and AC to DC converters include field effect transistors.

8. An acclerometer as in claim 6 wherein said DC to AC converter includes opto-isolators.

9. An accelerometer as in claim 5 together with comparator means coupled to the output of the accelerometer and providing a switch output.

10. An acclerometer as in claim 5 wherein the means coupling the source of AC power to the modulation means and demodulation means includes transformer means.

11. An accelerometer as in claim 10 wherein said transformer means coupled to the source of AC power is isolated by high impedance to prevent generation of a spurious torque signal by component short or by an open circuit.

12. An accelerometer as in claim 9 together with filter means connected between the demodulation means and the electrical input to the accelerometer.

13. In a servoed accelerometer having isolated voltae torquing, first and second independent grounds, means for supplying a torque signal and coupled to the first ground, a source of AC power, a servoed accelerometer having an electrical input and an electrical output, transformation means coupling the torque signal to the electrical input of the servoed accelerometer and serving to isolate the means for supplying torque signal from the electrical input of the accelerometer, said transformation means including a first transformer means having a primary winding and a secondary winding, a source of AC power connected to the primary winding of the first transformer having a center tap coupled to the second ground, second transformer means having a primary winding and a secondary winding with a center tap, resistive means coupling the primary winding of the second transformer means to the secondary winding of the first transformer means, third transformer means having a primary winding with a center tap and a secondary winding with a center tap, first and second field effect transistors connected across the primary winding of the third transformer means, third and fourth field effect transistors connected across the secondary of the second transformer means, high impedance means connecting the first and second field effect transistors to the secondary winding of the second transformer means, means connecting the first and second field effect transistors to the first ground and to the center tap of the secondary winding of the second transformer means, means coupling the center tap of the primary winding of the third transformer means to the means producing a torque signal, high impedence means coupling the third and fourth field effect transistors to the secondary winding of the first transformer means and means connecting the center tap of the secondary winding of the third transformer means to the electrical input of the accelerometer, said transformation means preserving the amplitude and polarity of the torque signal even though the means supplying the torque signal has a ground which is different from and independent of the ground for the electrical input for the accelerometer.

14. An accelerometer in claim 13 together with comparator means connected to the input of the accelerometer and providing a switch output.

15. An accelerometer as in claim 13 wherein the means connecting the center tap of the secondary winding of the third transformer means to the electrical input of the accelerometer includes a filter.

16. An accelerometer as in claim 14 together with a low pass filter connected between the output of the accelerometer and the comparator means.

17. In a destruct acceleration switch, an inertial sensor in the form of a servo accelerometer having an output means coupled to the output of the accelerometer and providing dynamics compensation to the output of the accelerometer, means connected to the means providing dynamics compensation for sensing detector failure, comparator means, means connecting the output from the dynamic compensation means to the comparator means, the comparator means having −g and +g comparators, AND gates connected to the comparator means and an OR gate connected to the AND gates and providing a switch output, means coupling the sensor failure detector to the OR gate and supplying a gate signal to the OR gate to enable the switch output until a failure is detected by the sensor failure detector.

18. In a method for voltage torquing a circuit to stimulate the output of a servo accelerometer by the use of an electrical torque signal simulating an acceleration input, modulating the torque signal with respect to a first ground to carry information as to the polarity and magnitude of the torque signal, demodulating the modulated torque signal with respect to a second ground isolated from the first ground to preserve the amplitude and polarity of the torque signal whereby the effectiveness of the circuitry can be tested by the use of an electrical torque signal simulating an acceleration input.

19. A method as in claim 18 wherein the modulation and demodulation are preformed synchronously.

* * * * *